(12) United States Patent
Rayner

(10) Patent No.: US 10,499,049 B2
(45) Date of Patent: *Dec. 3, 2019

(54) TEMPORAL ALIGNMENT SYSTEM AND METHOD

(71) Applicant: NEVION AS, Lysaker (NO)

(72) Inventor: Andrew Rayner, Felixstowe (GB)

(73) Assignee: Nevion AS (NO)

( * ) Notice: Subject to any disclaimer, the term of this patent is extended or adjusted under 35 U.S.C. 154(b) by 0 days.

This patent is subject to a terminal disclaimer.

(21) Appl. No.: 16/183,640

(22) Filed: Nov. 7, 2018

(65) Prior Publication Data

US 2019/0075291 A1 Mar. 7, 2019

Related U.S. Application Data

(63) Continuation of application No. 15/859,708, filed on Jan. 1, 2018, now Pat. No. 10,129,539, which is a continuation of application No. 15/632,340, filed on Jun. 24, 2017, now Pat. No. 9,860,526, which is a continuation of application No. 15/261,895, filed on Sep. 10, 2016, now Pat. No. 9,706,198.

(Continued)

(51) Int. Cl.
| | |
|---|---|
| *H04N 17/00* | (2006.01) |
| *H04N 3/22* | (2006.01) |
| *H04N 21/238* | (2011.01) |
| *H04N 21/242* | (2011.01) |
| *H04N 21/854* | (2011.01) |
| *H04N 5/14* | (2006.01) |
| *H04N 5/445* | (2011.01) |
| *H04N 5/38* | (2006.01) |
| *H04N 7/015* | (2006.01) |
| *H04N 21/2385* | (2011.01) |
| *H04N 21/845* | (2011.01) |

(52) U.S. Cl.
CPC .......... *H04N 17/004* (2013.01); *H04N 5/147* (2013.01); *H04N 5/38* (2013.01); *H04N 5/44591* (2013.01); *H04N 7/0152* (2013.01); *H04N 21/238* (2013.01); *H04N 21/2385* (2013.01); *H04N 21/242* (2013.01); *H04N 21/8456* (2013.01); *H04N 21/854* (2013.01)

(58) Field of Classification Search
CPC ........ H04N 17/00; H04N 17/02; H04N 17/04; H04N 17/004; H04N 5/38; H04N 5/74; H04N 7/0152; H04N 21/2385; H04N 21/8456; H04N 9/31; H04N 9/28; H04N 3/2335; H04N 3/22; H04N 3/23; H04N 3/223; H04N 3/227
USPC .................. 348/190, 194, 745–746, 806, 807
See application file for complete search history.

(56) References Cited

U.S. PATENT DOCUMENTS

| | | |
|---|---|---|
| 2009/0046925 A1 | 2/2009 | Lin |
| 2010/0158406 A1 | 6/2010 | Kim et al. |

(Continued)

FOREIGN PATENT DOCUMENTS

KR 101347956 B1 1/2014

*Primary Examiner* — Sherrie Hsia
(74) *Attorney, Agent, or Firm* — Paul D. Chancellor; Ocean Law

(57) ABSTRACT

A temporal alignment system and method for example for detecting temporal misalignment in video frames when the frames are divided for transport using a signal divider for dividing a single signal S into portions $S_1 \ldots S_N$ and using average picture level in determining whether data sets within a particular frame are misaligned.

10 Claims, 10 Drawing Sheets

Related U.S. Application Data

(60) Provisional application No. 62/217,523, filed on Sep. 11, 2015.

(56) References Cited

U.S. PATENT DOCUMENTS

| | | |
|---|---|---|
| 2011/0063408 A1 | 3/2011 | Huang et al. |
| 2014/0240516 A1 | 8/2014 | Kolarov et al. |
| 2015/0092109 A1 | 4/2015 | Mo et al. |
| 2016/0165226 A1 | 6/2016 | Djurdjevic |

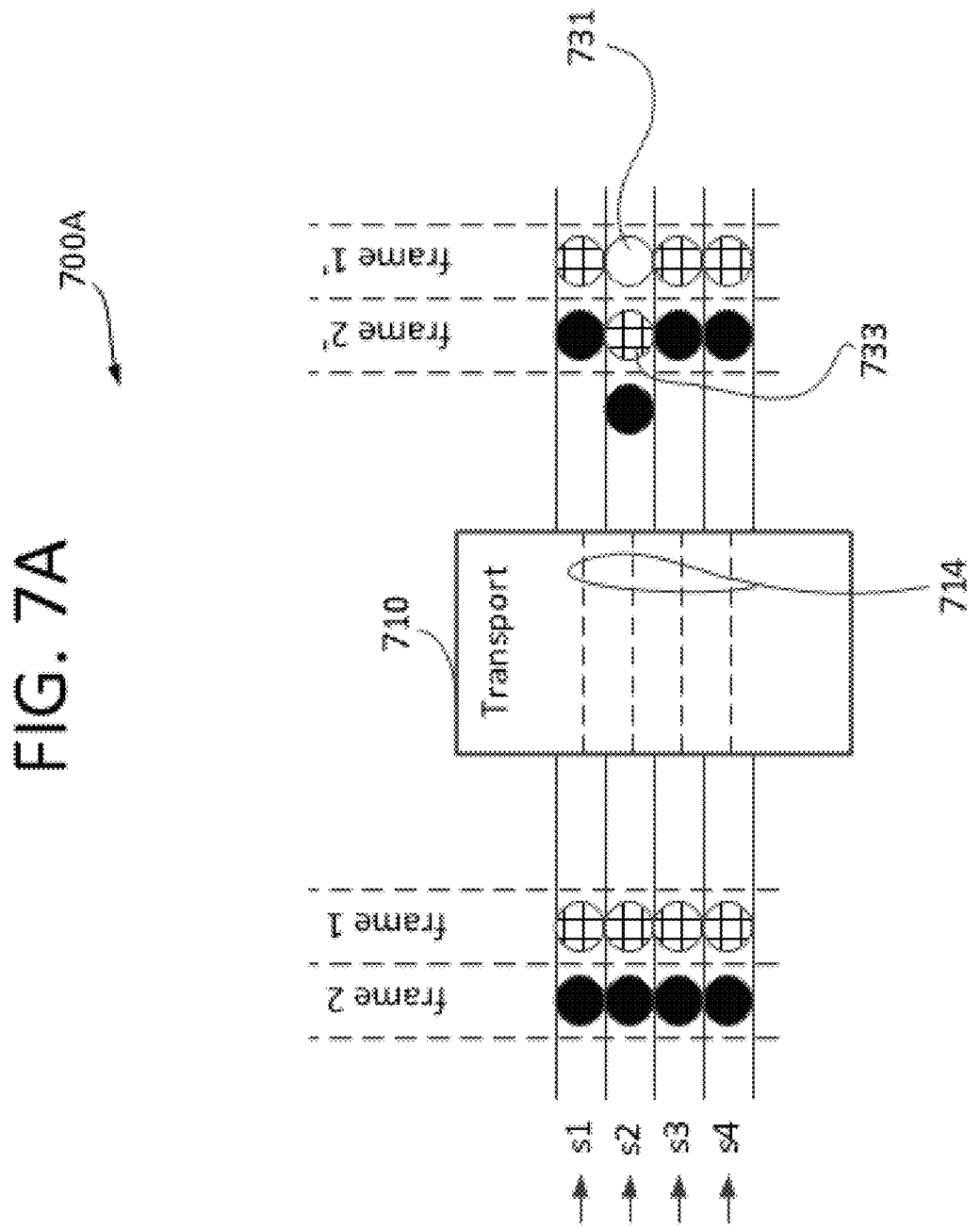

TEMPORAL ALIGNMENT SYSTEM AND METHOD

PRIORITY CLAIM AND INCORPORATION BY REFERENCE

This application is a continuation of U.S. patent application Ser. No. 15/859,708 filed Jan. 1, 2018 which is a continuation of U.S. patent application Ser. No. 15/632,340 filed Jun. 24, 2017 now U.S. Pat. No. 9,860,526 which is a continuation of U.S. patent application Ser. No. 15/261,895 now U.S. Pat. No. 9,706,198 filed Sep. 10, 2016 which claims the benefit of U.S. Provisional Patent Application No. 62/217,523 filed Sep. 11, 2015, entitled Temporal Alignment System and Method, which are incorporated herein by reference in their entirety and for all purposes.

BACKGROUND OF THE INVENTION

Broadcast and production signal transport requiring original signal division and multilink transport is in a protracted infancy. Reasons include lack of proven equipment and movie and television industry reluctance to develop, implement, and use equipment capable of transporting ultra-high definition signals such as or similar to 4K signals (see e.g., DCI 4K, UHDTV, UHD-1, UHD 4K, 4K).

FIELD OF INVENTION

This invention relates to the electrical and process arts. In particular, a system and method for enhancing temporal signal alignment.

DISCUSSION OF THE RELATED ART

While temporal signal alignment is well known in some applications, temporal signal alignment and realignment in the context of 4K images transported over multiple lines is not well known. Further, temporal signal alignment systems operating in a 4K environment without the use of time stamps embedded in the signal are to the author's knowledge unknown.

SUMMARY OF THE INVENTION

The present invention provides a temporal alignment system and method. Various embodiments may be used in connection with determining whether frames, panes, signals, and/or data sets are aligned.

In an embodiment, a system for detecting temporal misalignment in video frames that are divided for transport, the system comprises: a signal divider for dividing a single signal S into N signal portions $S_1 \ldots S_N$; each signal portion for carrying a portion of the same video frame; N transport links, each link for receiving a respective signal Sx from the signal divider and for delivering a signal Sx' to a signal reassembler ($1 \leq x \leq N$); the signal reassembler for selectively reassembling signal portions corresponding to $S_1' \ldots S_N'$ into a single signal S'; and, a misalignment monitor colocated with the signal reassembler; wherein the monitor utilizes information inherent in the signal portions $S_1' \ldots S_N'$ to detect whether temporal frame misalignment has occurred.

In some embodiments, the system above and one or more of i) wherein the signals are Serial Digital Interface signals for transmitting 4K video, ii) wherein N=4, iii) further comprising a facility of the monitor for evaluating average picture level for each of signal portions and wherein the monitor facility for evaluating average picture level is used in determining whether a temporal frame misalignment has occurred and used in correcting a discovered temporal frame misalignment, iv) further comprising a facility of the monitor for evaluating average picture level for each of signal portions $S_1' \ldots S_N'$ and wherein changes in average picture level caused by one or more scene cuts are used in determining whether a temporal frame misalignment has occurred, v) further comprising a facility of the monitor for evaluating average picture level for each of signal portions $S_1' \ldots S_N'$ and wherein temporal alignment of changes in average picture level among the signal portions $S_1' \ldots S_N'$ is used to determine whether a temporal frame misalignment has occurred, and vi) further comprising a facility of the monitor for evaluating average picture level for each of signal portions and wherein temporal alignment of discontinuities in average picture level among the signal portions $S_1' \ldots S_N'$ is used to determine whether temporal frame misalignment has occurred.

In an embodiment a video frame temporal misalignment detection method comprising the steps of: providing a 4K video camera for acquiring images, each image contained in a video frame that is divisible into 4 panes; from one or more camera outputs, deriving 4 SDI signals corresponding to respective video frame panes; the SDI signals transporting the video frames over respective links such that during transport a pane of a particular frame is temporally misaligned and appears as a pane of another frame; providing a misalignment monitor with a facility for monitoring average picture level of each of the SDI signals; and, determining a temporal misalignment event has occurred when average picture level changes fail to occur simultaneously.

In some embodiments, the method above and one or more of the steps i) wherein the monitor is configured to detect changes in average picture level arising from scene cuts, ii) wherein each pane of a frame is a one quarter slice of the image, wherein each pane of a frame reproduces the image at a reduced resolution, and iii) providing a frame reassembler coupled to the links and the monitor and wherein upon discovery of a video frame temporal misalignment event the monitor causes the reassembler to correct the misalignment by time shifting reassembler data received from at least one of the derived SDI signals.

In an embodiment, method for finding misaligned data sets comprising the steps of: dividing a 4K video signal for transport along 4 SDI links; transporting the 4K video signal along the SDI links; near a transport terminus, comparing temporal alignment of an average picture level discontinuity in each SDI link; and, finding a temporal correction is needed when the discontinuities are not substantially temporally aligned.

BRIEF DESCRIPTION OF THE DRAWINGS

The present invention is described with reference to the accompanying figures. The figures, incorporated herein and forming part of the specification, illustrate the present invention and, together with the description, further serve to explain the principles of the invention and to enable a person skilled in the relevant art to make and use the invention.

FIG. 7A illustrates temporally misaligned signal transport 700A.

DETAILED DESCRIPTION OF THE PREFERRED EMBODIMENTS

The disclosure provided in the following pages describes examples of some embodiments of the invention. The designs, figures, and descriptions are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed inventions.

Where parts are connected, descriptions herein using the words "coupled," "connected," or "interconnected" refer to either direct or indirect connections. Direct connections provide for a first part connected directly to a second part, for example A connected directly to B. Indirect connections provide for a first part connected indirectly to a second part, for example A connected indirectly to C via B.

Figure 1:
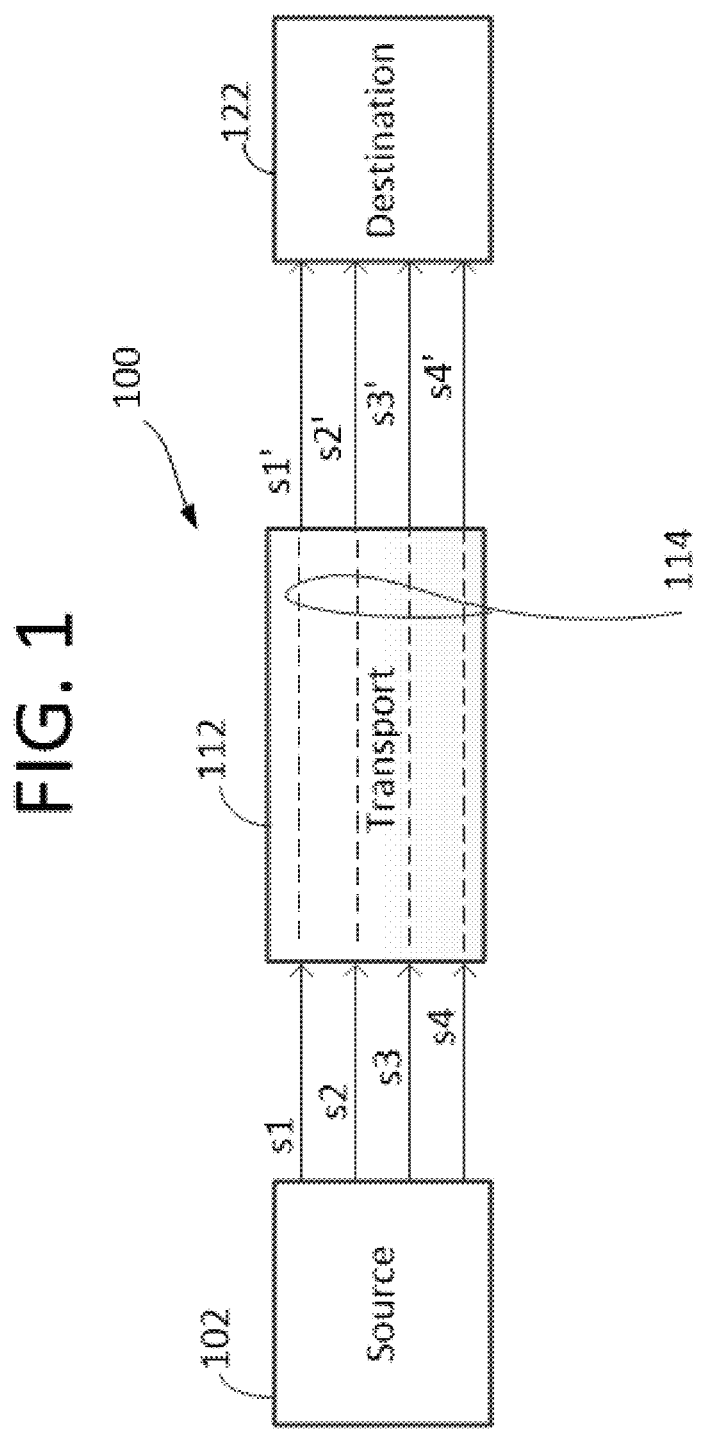
FIG. 1 shows a multi-link signal transport system of the present invention.

FIG. 1 shows a multi-link signal transport system 100. As seen, a transport block 112 interconnects a source block 102 and a destination block 122.

In the source block 102, a signal such as an image signal is divided among four signal outputs s1-s4. In an embodiment, the source block includes a video camera that i) acquires a 4K or similar image and provides multiple output signals s1-s4 that may be combined to reproduce the acquired 4K image.

Signals such as image signals transported from a source 102 to a destination 122, which may be and/or include a reassembler, can be divided at the source, transported via links, and reassembled at the destination. For example, where a 4K image is transported 112, it may be transported via multiple HD-SDI links. In particular, four (4) HD-SDI links 114 at 3 Gb/s might be used where each link carries one quarter (¼) of the 4K image information. As shown, signals s1-s4 from the source 102 are transported via links 114 and arrive at the destination 122 as signals s1'-s4'.

Notably, to the extent that signals s1-s4 are transported 112 with temporal and content fidelity, then signals s1'-s4' may be reassembled to reproduce a 4K image that was acquired by the camera. However, it is not always the case that fidelity is maintained. In particular, loss of temporal fidelity may occur due, for example, to varying signal transit times among the transport links 114.

Figure 2:
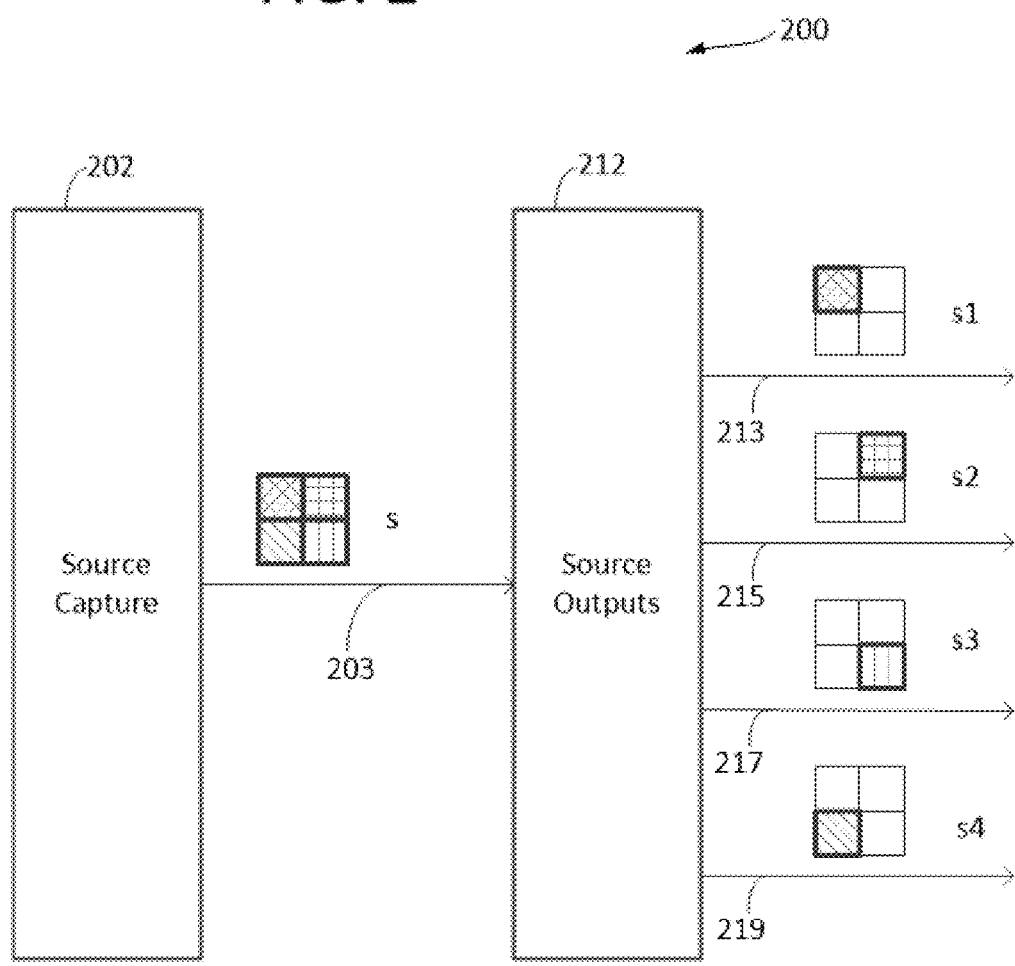
FIG. 2 shows a source with signal division for use with the system of FIG. 1.

FIG. 2 shows a source with signal division 200. Where content such as 4K imagery is captured via a device such as a digital video camera, the content may be readied for transport by multiple links as described above. For example, imagery captured is a source capture block 202 results in a signal "s" that is fed 203 to a source outputs block 212. The four square checkerboard icon with all four blocks marked indicates a full bandwidth 4K signal.

In the source outputs block 212, the 4K signal is repackaged for transport by four links. At a first output 213, a signal s1 provides ¼ of the 4K bandwidth and carries ¼ of the 4K content as indicated by the top left block of the checkerboard icon. At a second output 215, a signal s2 provides ¼ of the 4K bandwidth and carries % of the 4K content as indicated by the top right block of the checkerboard icon. At a third output 217, a signal s3 provides ¼ of the 4K bandwidth and carries ¼ of the 4K content as indicated by the bottom right block of the checkerboard icon. At a fourth output 219, a signal s4 provides ¼ of the 4K bandwidth and carries ¼ of the 4K content as indicated by the bottom left block of the checkerboard icon.

Signals such as images and 4K images in 4K camera video can be carried by multiple links as described above. FIGS. 3A-B, 4A-B illustrate two types of signal or image division enabling multilink transport.

Figure 3A:
FIG. 3A shows a 4K image.
Figure 3B:
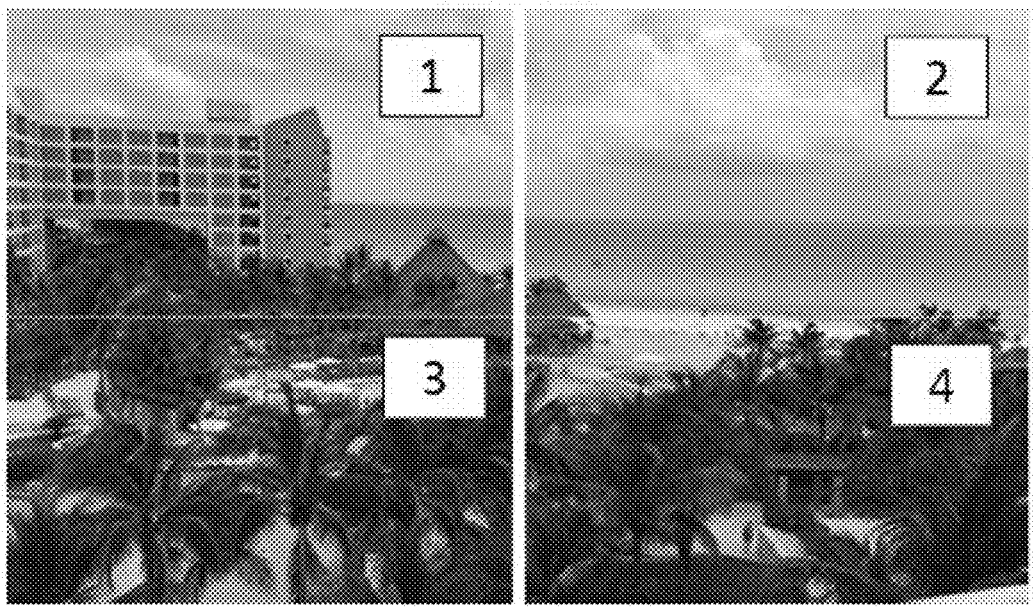
FIG. 3B shows a square division quad split of the image of FIG. 3A.

FIG. 3A shows a 4K image 300A and FIG. 3B shows a square division quad split 300B of the image of FIG. 3A. In particular, the image of FIG. 3A is divided into four image portions, each image portion reproducing or indicating a ¼ share of the original 4K image. Pane 1 is upper left, pane 2 is upper right, pane 4 is lower right, and pane 3 is lower left. As skilled artisans will appreciate, reproduction of the original 4K image from a group of 4 panes representing a single frame requires temporal alignment of the panes.

Figure 4A:
FIG. 4A shows a 4K image.
Figure 4B:
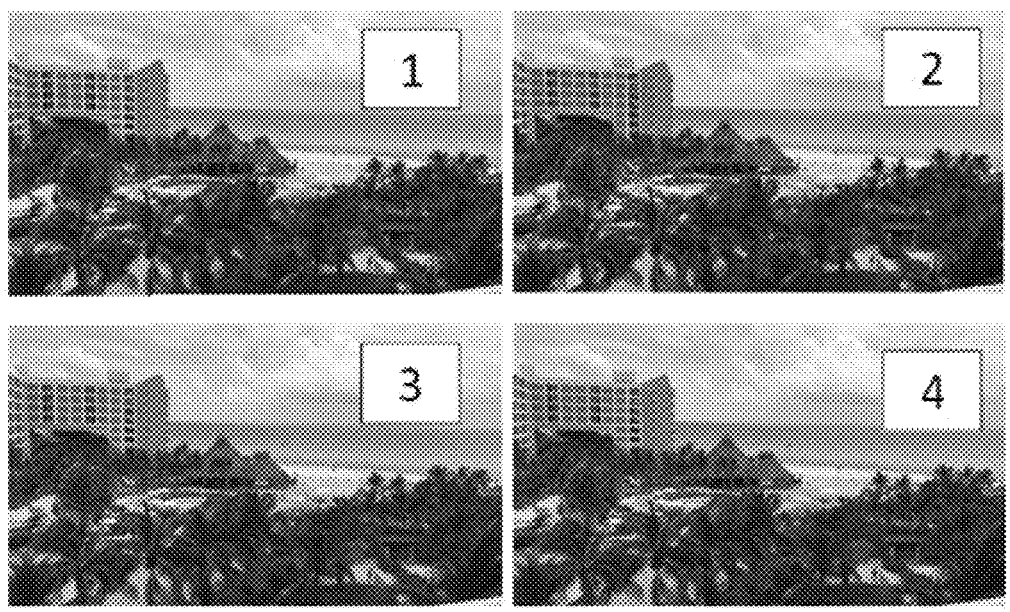
FIG. 4B shows an interleaved or two sample interleave of the image of FIG. 4A.

FIG. 4A shows a 4K image 400A and FIG. 4B shows an interleaved or two sample interleave of the image 400B of FIG. 4A. As in FIGS. 3A-B, the 4K image is divided into 4 panes. But, here, each pane carries the whole image at % of its original resolution. This method is referred to as interleaving, here a 2 sample interleave. For example, pane 1 is the whole image with 0-25% of the content, pane 2 is the whole image with 26-50% of the content, pane 3 is the whole image with 51-75% of the content, and pane 4 is the whole image with 76-100% of the content.

Figure 5:
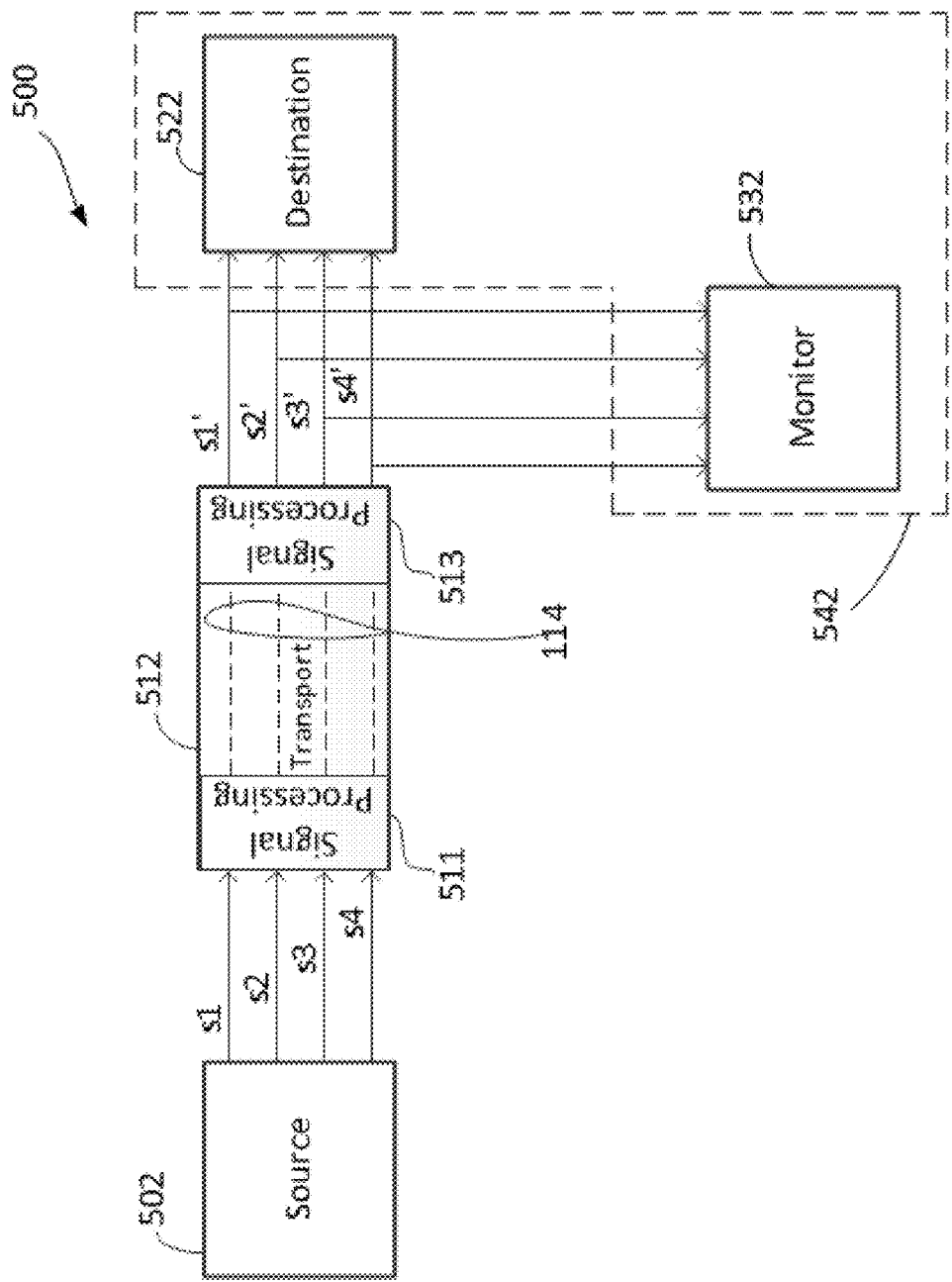
FIG. 5 shows an exemplary multi-link signal transport system with temporal alignment monitoring.

FIG. 5 shows an exemplary multi-link signal transport system with temporal alignment monitoring 500. As seen, a transport block 512 interconnects a source block 502 and a destination block 522.

In the source block 502, a signal such as an image signal is divided among four signal outputs s1-s4. In an embodiment, the source block includes a video camera that i) acquires a 4K or similar image and provides multiple output signals s1-s4 that may be combined to reproduce the acquired 4K image.

As described above, signals such as image signals transported from a source 502 to a destination 522 can be divided at the source, transported via links, and reassembled at the destination. Signal processing such as compression may occur at a first signal processor 511 and signal processing such as decompression may occur at a second signal processor 513 (e.g., JPEG 2000, H264). In some embodiments, the compression and decompression method provides for a lossless data transfer.

Signals s1-s4 from the source 502 are transported via links 114 and arrive at the destination 522 as signals s1'-s4'. Notably, to the extent that signals s1-s4 are transported 512 with temporal and content fidelity, then signals s1'-s4' may be combined to reproduce a 4K image that is a replica or near replica of the image acquired by the camera. However, it is not always the case that temporal fidelity is maintained.

In particular, loss of temporal fidelity may occur due, for example, to varying signal transit times among the transport links 114.

As shown, the transported signals s1'-s4' are inputs to a monitor or monitoring block 532. The monitoring block provides a means for determining temporal alignment and/or temporal misalignment of signals s1'-s4'. In some embodiments, the destination block 522 and monitor block may be collocated and/or packaged in a common main (as in a rack) or sub (as in a chassis enclosure) housing. In some embodiments the packaged destination 522 and monitor 532 blocks may be referred to as a receiver 542.

Figure 6A:
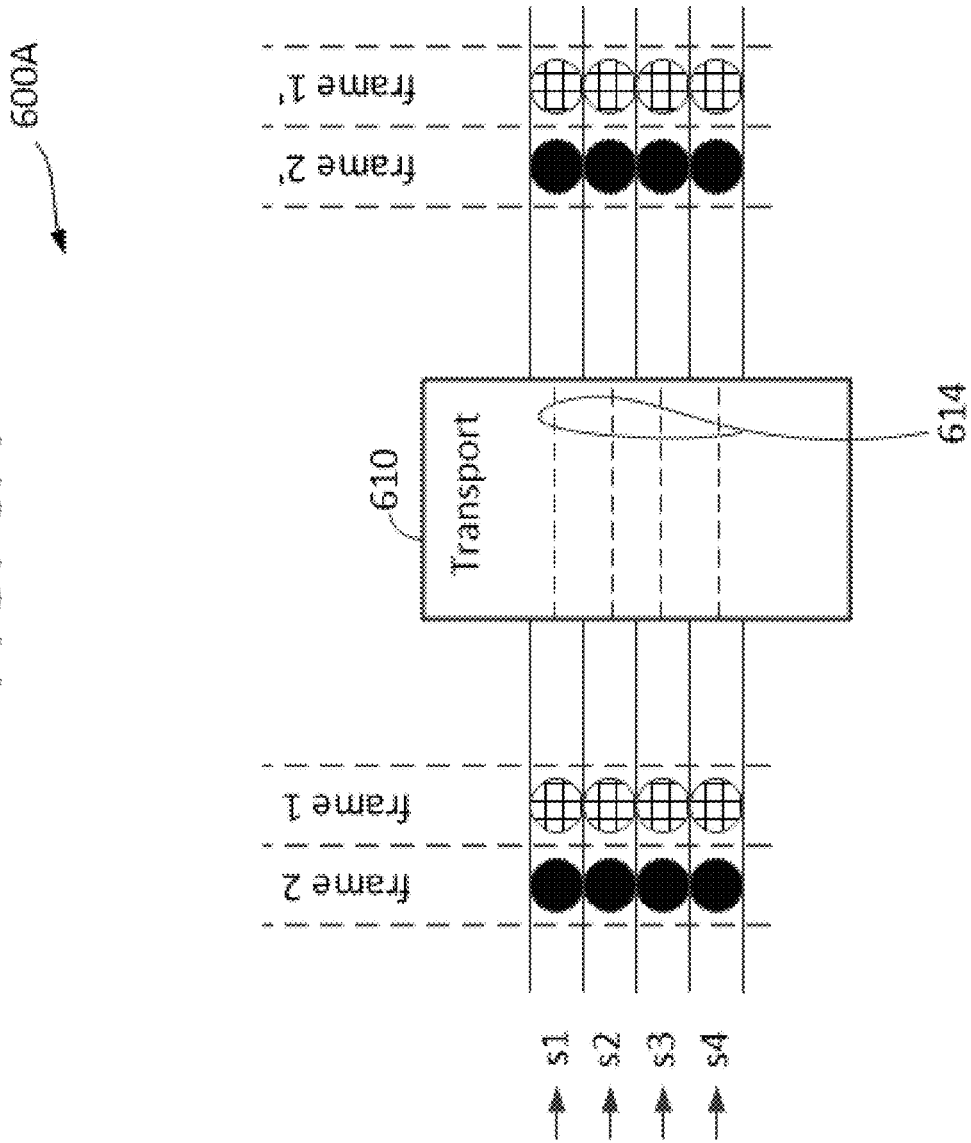
FIG. 6A illustrates temporally aligned signal transport 600A.

FIG. 6A illustrates temporally aligned signal transport 600A. As seen, signals s1-s4 load frames 1, 2 for transport 610. Each frame is divided for transport along four links 614.

At the transport input, frame 1 includes four temporally aligned data sets resulting from dividing a first signal such as a 4K signal. Frame 2 includes 4 temporally aligned data sets resulting from dividing a second signal such as a 4K signal.

At the transport output, frame 1' includes the four temporally aligned data sets that were input as frame 1 and frame 2' includes the four temporally aligned data sets that were input as frame 2.

Methods of monitoring the temporal alignment illustrated in FIG. 6A include time stamp methods where information added, i.e., the "time stamp," to the content being transported provides a basis for assessing temporal alignment.

Another temporal alignment assessment method does not require that information be added. Rather, information inherent in the content provides a basis for assessing temporal alignment. One or both of inherent and non-inherent assessment methods may be used in the temporal alignment monitor 532 of FIG. 5.

Figure 6B:
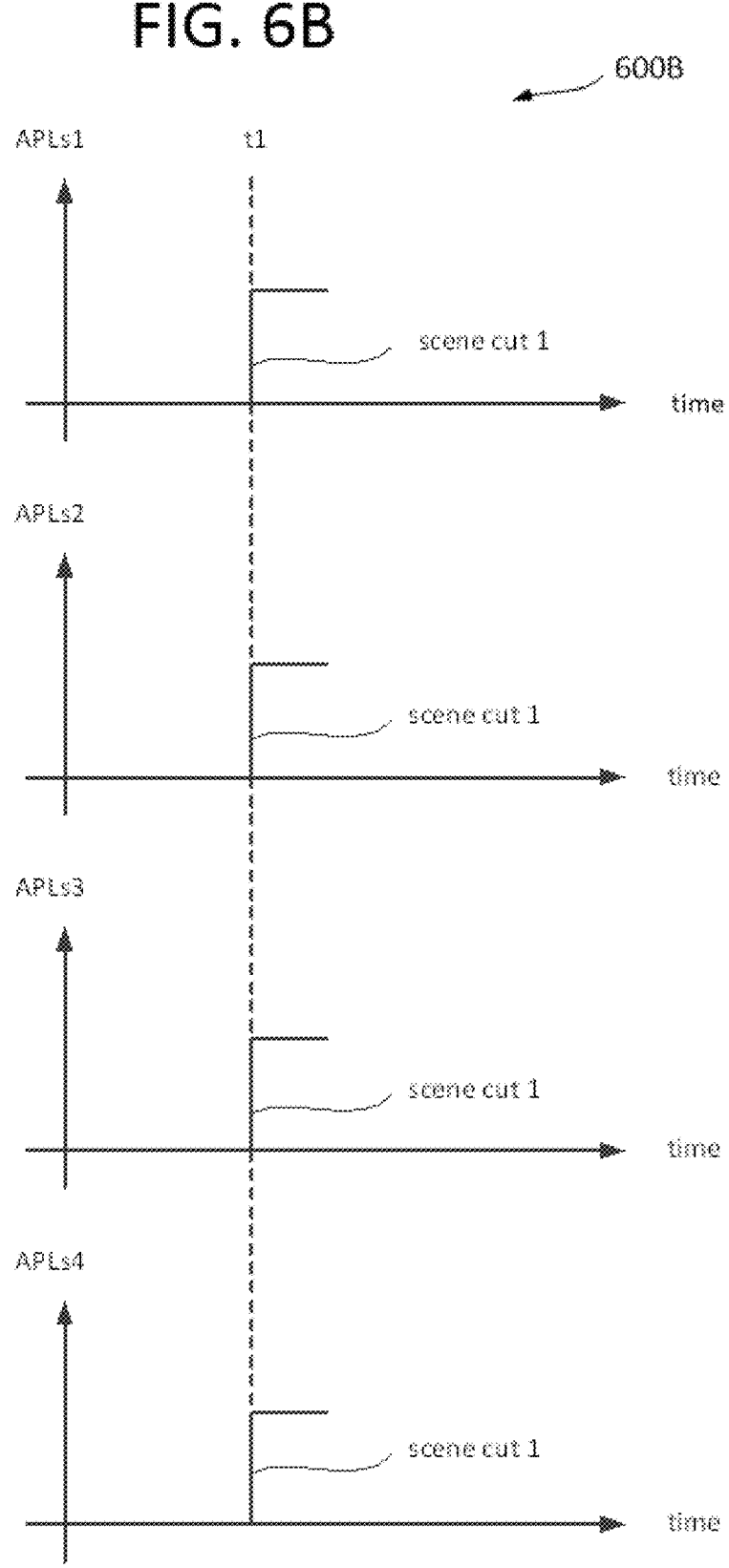
FIG. 6B shows an exemplary inherent temporal alignment assessment method.

Corresponding to FIG. 6A, FIG. 6B shows an exemplary inherent temporal alignment assessment method 600B. For each of four links and link signals s1-s4 values of average picture level ("APL") are plotted against a common time axis. In an embodiment, average picture level is an average level of the picture signal. In an embodiment, average picture level is the average level of the picture signal during active scanning time integrated over a frame period. APL may be defined as a percentage of the range between blanking and reference white level. In some embodiments, any consistently used measure of APL suffices (see e.g., IDMS 1.03 Information Display Measurements Standard (IDMS), pre-gamma APL (Type 1 APL) for gamma corrected input signal (R, G, B) and post-gamma APL (Type 2 APL) for gamma de-corrected panel display signal (R', G', B')).

As the plots show, APL data on each of the links (APLs1 . . . APLs4) indicates a change or discontinuity in average picture level such as an APL change associated with a scene cut. Moreover, this change in APL occurs simultaneously, at time t1, for all of the links.

Monitoring this information, temporal alignment of changes or discontinuities, provides a method of finding when data on multiple links representing a particular frame is not temporally aligned. Notably, this telltale sign of temporal misalignment is part of the picture content and thus is inherent in the signals being transported.

FIG. 7A illustrates a signal transport that is temporally misaligned 700A. As seen, signals s1-s4 load frames 1, 2 for transport 710. Each frame is divided for transport along four links 714.

At the transport input, frame 1 includes four temporally aligned data sets resulting from dividing a first signal such as a 4K signal. Frame 2 includes 4 temporally aligned data sets resulting from dividing a second signal such as a 4K signal.

At the transport output, frame 1' includes three temporally aligned data sets that were input as frame 1 and one temporally misaligned data set 731. Frame 1' is therefore temporally misaligned, for example because the frame excludes data it should include or includes input data sets from different input data frames. In similar fashion, frame 2' is temporally misaligned, for example because it includes a misaligned frame 733.

Figure 7B:
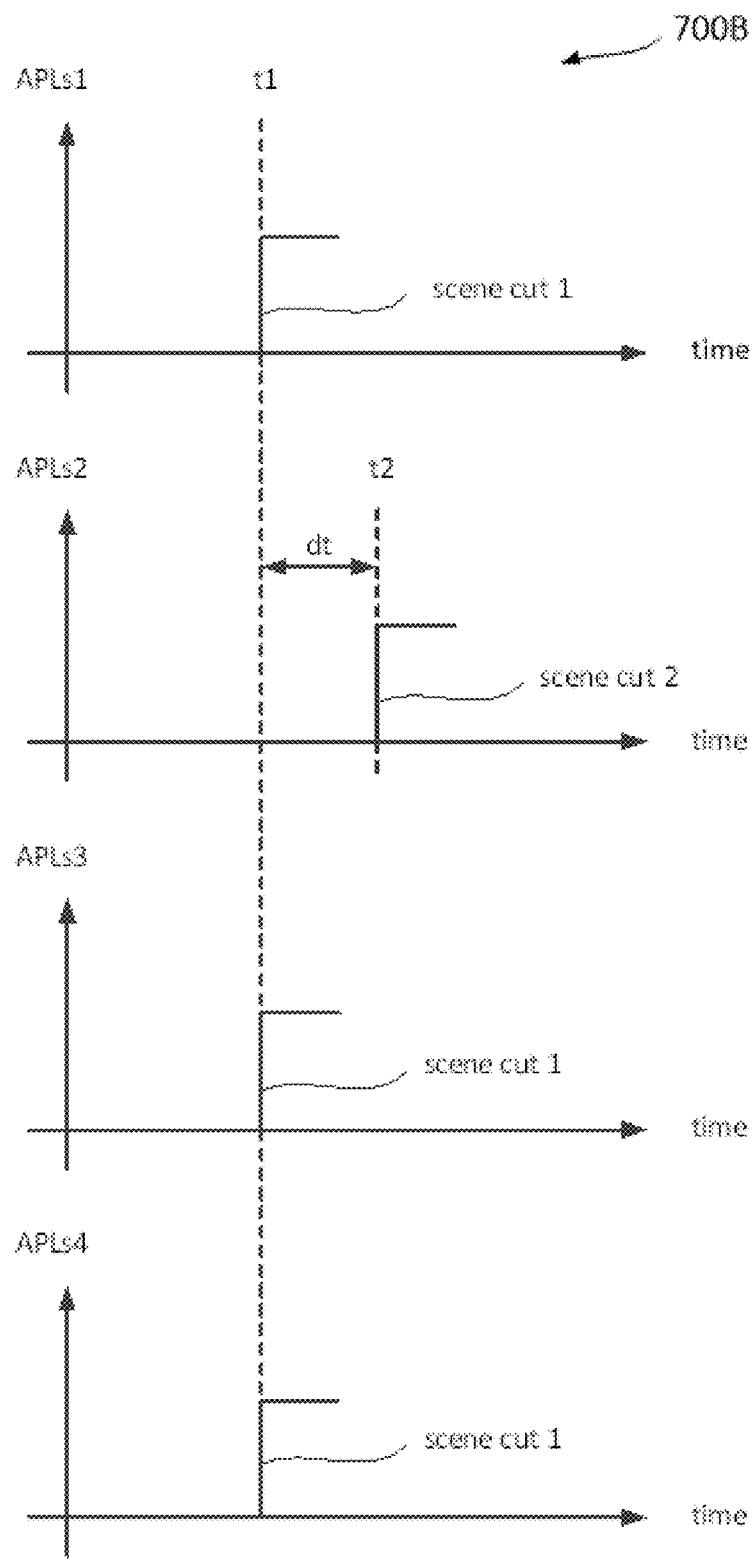
FIG. 7B shows an exemplary inherent temporal misalignment assessment method.

Corresponding to FIG. 7A, FIG. 7B shows an assessment of temporal alignment 700B. For each of four links and link signals s1-s4 values of average picture level ("APL") are plotted against a common time axis.

As the plots show, APL data on each of the links (APLs1 . . . APLs4) indicates a change or discontinuity in average picture level such as an APL change associated with a scene cut. As the plots show, APL data on each of the links (APLs1 . . . APLs4) indicates a change or discontinuity in average picture level such as an APL change associated with a scene cut.

For three of the links, APLs1, APLs3, APLs4, the change in APL occurs simultaneously, at time t1 and corresponds with a first discontinuity, for example a scene cut, such as scene cut 1.

For one of the links, APLs2, the change in APL occurs at a different time t2 corresponding with a second discontinuity such as scene cut 2 where t2−t1=dt.

Monitoring this information, temporal alignment of changes or discontinuities, provides a method of finding when data on multiple links representing a particular frame is not temporally aligned. Notably, this telltale sign of temporal misalignment is part of the picture content and thus is inherent in the signals being transported.

Figure 8:
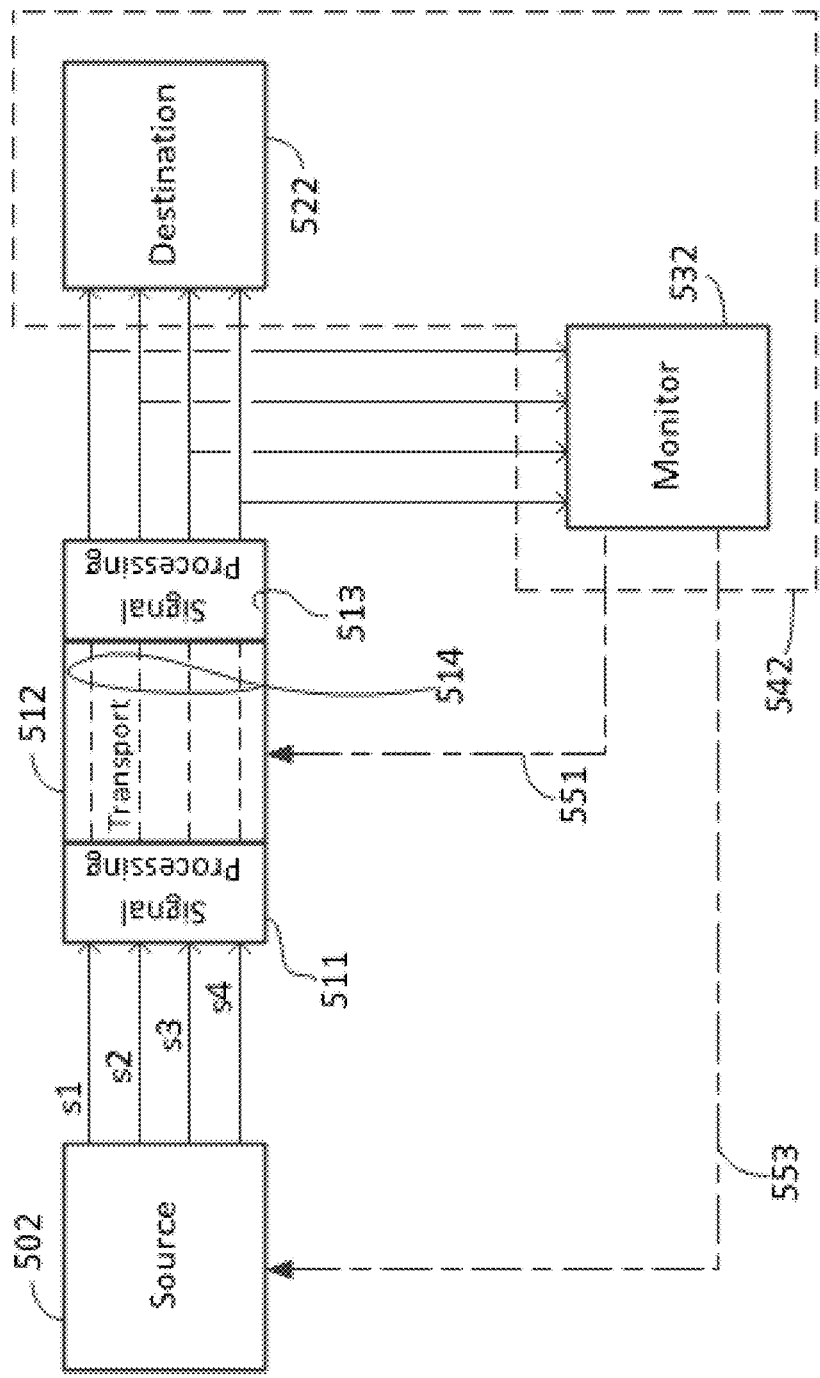
FIG. 8 shows another embodiment of the multi-link signal transport system with temporal alignment monitoring of FIG. 5.

FIG. 8 shows another embodiment 800 of the multi-link signal transport system with temporal alignment monitoring of FIG. 5.

In an embodiment, a first signal line 551 interconnecting the monitor and transport blocks 532, 512 enables the monitor block to realign data sets along links such that data sets within frames are aligned. Control function capabilities include speeding or slowing transport throughput on any one or more of the links 514.

In an embodiment, a second signal line 553 interconnecting the monitor and source blocks 532, 502 enables the monitor block to realign data sets along links such that data sets within frames are aligned. Control function capabilities including speeding or slowing source data rates along any one or more of the data source outputs.

The appendix to this application provides descriptions of similar and/or other embodiments of the present invention.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A method for aligning video signal portions, the method comprising the steps of:
   providing an inherent video signal feature in a video signal and transporting parts of the video signal along multiple links;
   in plural links, comparing temporal alignment of a change of state of the feature;
   where misalignment is found, changing the temporal alignment of one or more transported signals; and,
   compressing the video signal before transporting the video signal along multiple links and decompressing the video signal after transporting the video signal.

2. A method for aligning video signal portions, the method comprising the steps of:
   providing an inherent video signal feature in a video signal and transporting parts of the video signal along multiple links;
   in plural links, comparing temporal alignment of a change of state of the feature;
   where misalignment is found, changing the temporal alignment of one or more transported signals; and,
   monitoring the transported parts of the video signal along multiple links; and,
   based on the monitoring, varying transport rates on one or more links to change the temporal alignment of one or more transported signals.

3. A method for aligning video signal portions, the method comprising the steps of:
   providing an inherent video signal feature in a video signal and transporting parts of the video signal along multiple links;
   in plural links, comparing temporal alignment of a change of state of the feature;
   where misalignment is found, changing the temporal alignment of one or more transported signals; and,
   monitoring a video signal source; and,
   based on the monitoring, varying one or more source data rates to change the temporal alignment of one or more transported signals.

4. A video processing device comprising:
   a transport block and a monitor block;
   the device for use with a source and a destination;
   four source output signals containing information from a first video frame;
   the transport block for transporting signals derived from the four source output signals;
   the monitor block for monitoring the transported signals and for determining if the transported signals contain information from a video frame other than the first video frame, the determination based on temporal alignment of a feature in each of the transported signals; and,
   four destination input signals containing information derived from the first video frame.

5. The device of claim 4 wherein the four source output signals are Serial Digital Interface ("SDI") signals.

6. The device of claim 5 further comprising:
   the monitor block for monitoring the transport of the signals along multiple links to detect misalignment and for changing the temporal alignment of one or more transported signals by changing link transport rates.

7. The device of claim 5 further comprising:
   the monitor block for monitoring a video signal source and for changing the temporal alignment of one or more transported signals by varying one or more source data rates.

8. The device of claim 5 wherein the transported signal feature is related to average picture level (APL).

9. The device of claim 5 wherein the transported signal feature corresponds to a scene cut.

10. The device of claim 5 wherein the source is a video camera that provides four video output signals that together comprise an image.

* * * * *